United States Patent [19]

Spitzmesser

[11] 4,239,172

[45] Dec. 16, 1980

[54] ENGINE MOUNT FOR MARINE CRAFT

[76] Inventor: Gordon Spitzmesser, 1405 Cherokee Dr., West Columbia, S.C. 29169

[21] Appl. No.: 42,527

[22] Filed: May 25, 1979

[51] Int. Cl.$^3$ .............................................. F16M 13/00

[52] U.S. Cl. .................................................... 248/641

[58] Field of Search ............... 248/640, 641, 642, 643; 115/17

[56] References Cited

U.S. PATENT DOCUMENTS

| | | | |
|---|---|---|---|
| 2,886,462 | 5/1959 | Jagiel | 115/17 |
| 2,928,630 | 3/1960 | Wisman | 248/641 |
| 3,061,250 | 10/1962 | Conover | 248/642 |
| 3,106,375 | 10/1963 | Donaldson | 248/643 |
| 3,310,021 | 3/1967 | Shimanckas | 115/17 |
| 3,943,877 | 3/1976 | Kemp | 248/642 |

FOREIGN PATENT DOCUMENTS

| | | | |
|---|---|---|---|
| 785001 | 5/1968 | Canada | 115/17 |

*Primary Examiner*—William H. Schultz
*Attorney, Agent, or Firm*—Jenkins, Coffey, et al; Jenkins, Coffey, Hyland, Badger & Conard

[57] ABSTRACT

A marine craft outboard engine mount includes side-plate brackets which are wider at the top than at the bottom to permit "tucking" of the propeller under the transom. This provides a greater power-on thrust, giving a marine craft operator forward motion with a greater lift factor. Forward motion and the lift factor working simultaneously prevent the boat from "bogging down." With the engine mount, the engine sits in a higher position, and further behind the transom, which leads to increased performance.

12 Claims, 2 Drawing Figures

Figure 1:
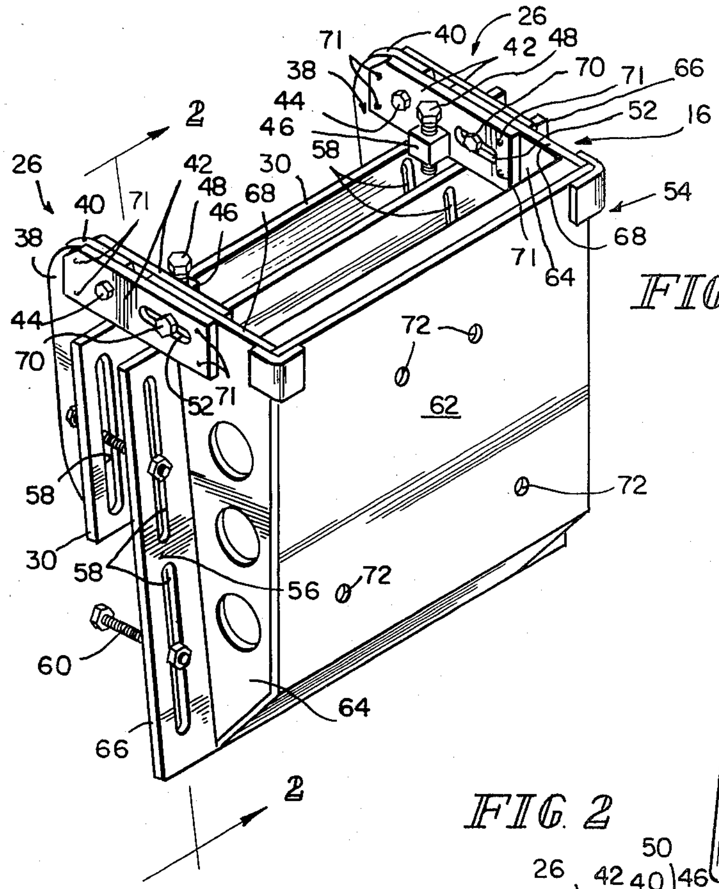

ENGINE MOUNT FOR MARINE CRAFTThis invention relates to engine mounts for outboard engines for use in marine craft. Although the engine mount is particularly useful with what are known as high-performance marine craft, the mount is useful with all types of light marine craft.

Various types of outboard engine mounts for light marine craft are known. There are, for example, the mounts of Schleisner U.S. Pat No. 2,379,256; Donaldson U.S. Pat. No. 3,106,375; Kelly U.S. Pat. No. 3,112,092 and Roemer U.S. Pat. No. 2,939,658.

It is an object of the present invention to provide an improved engine mount for light marine craft outboard engines which permits a greater adjustment of the propeller center line of rotation to move this center line, hereinafter frequently called the center line of thrust, further beneath the horizontal than was possible with prior art engine mounts. It is believed that the ability to move the center line of thrust well beneath the horizontal, to tuck the propeller under the transom, so to speak, enables a propeller-on thrust which gives not only forward motion, but a greater lift factor. This increased lift factor, working simultaneously with the forward motion of acceleration, prevents the boat from bogging down.

Additionally, it is an object of the present invention to provide an engine mount for light marine craft outboard engines which positions the engine higher and further behind the transon, both of which are believed to provide increased performance.

According to the invention, an engine mount for a marine craft outboard engine includes first means for mounting over the vertically upper edge of the marine craft transom, second means for attachment to the first means, means for selectively movably attaching the second means to the first, and means for mounting the engine for tilting movement in a generally vertical plane relative to the second means, the engine mounting means being attached to, and positioned rearwardly of the second means.

Illustratively, the first means includes a first plate for mounting generally parallel to the transom and on the inboard side thereof, and a connecting link extending over the transom to form with the first plate a "hook."

Further according to an illustrative embodiment, the second means includes a plate for mounting generally parallel to the transom, and on the outboard side thereof, and a movable mount permitting selective variable movement between the first and second plates. The movable mount includes slots provided on one of the first and second means, and pins mounted on the other of the first and second means for insertion into the slots and for selective movement in the slots to adjust the orientations of the first and second means relative to each other.

According to the illustrative embodiment, the engine mounting means includes an engine carrier for supporting the engine, and means for supporting the engine carrier rearwardly of the second means. The means for supporting the engine carrier rearwardly from the second means includes a sideplate bracket mounted on, and extending rearwardly from, the second means plate. The bracket includes a rearward portion against which the carrier is positioned.

Further, according to the present invention, the apparatus includes a pair of such sideplate brackets, with the brackets extending generally vertically across the second means plate and transom. The sideplate brackets are spaced apart generally longitudinally of the second means plate and transom.

According to the invention, the sideplate brackets are so constructed that the engine carrier slopes downwardly and toward the transom to permit tilting movement of the engine to position the center line of thrust such that it points downwardly away from the transom and upwardly toward the transom. That is, the configuration of the sideplate brackets permits "tucking in" of the propeller behind and beneath the transom.

The presence of the sideplate brackets insures that the engine will be positioned further behind the transom. The configuration of the sideplates and carrier further permits an engine mounting system in which the engine is carried higher behind the transom.

Figure 2:
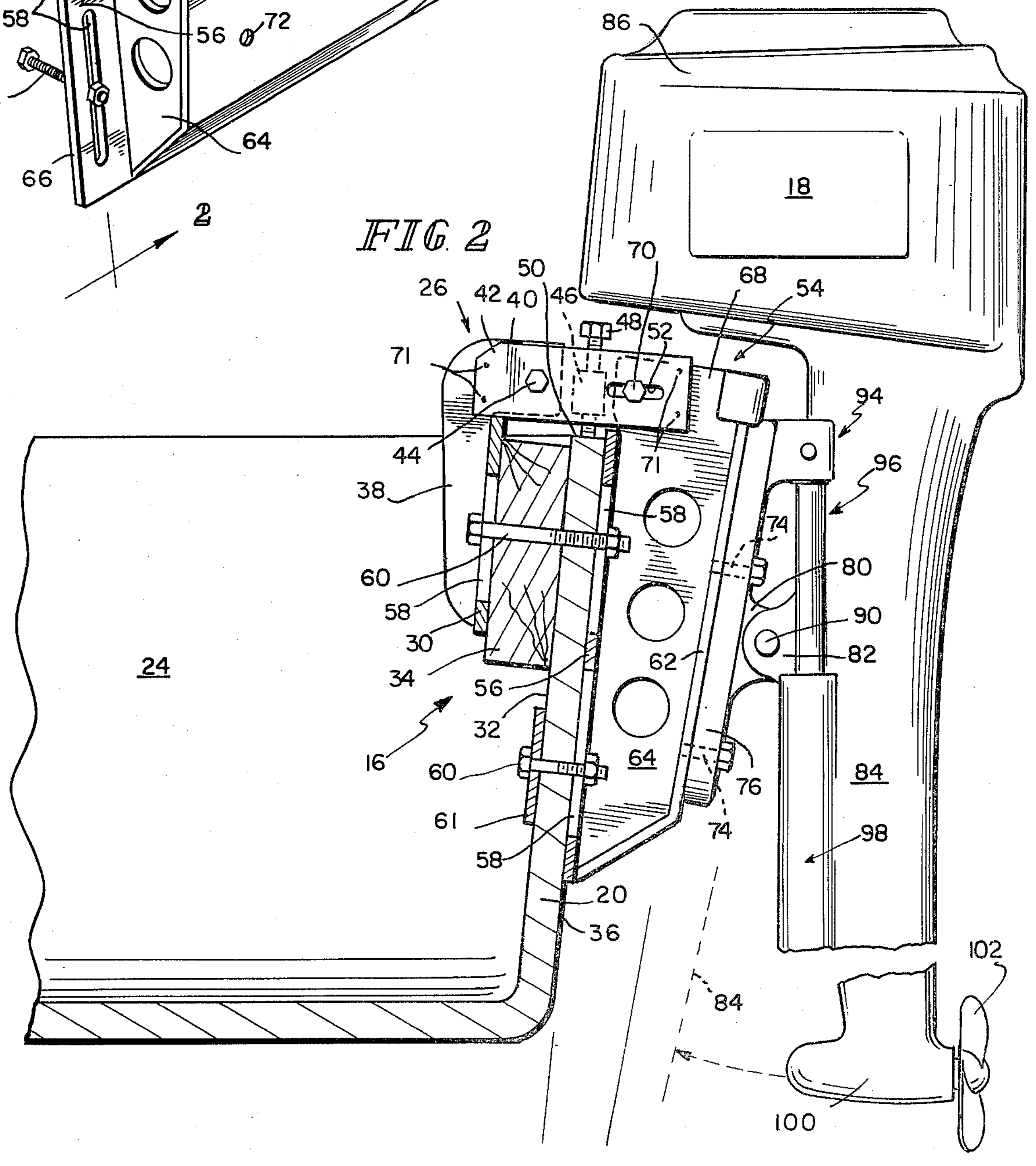

The invention may best be understood by referring to the following description and accompanying drawings which illustrate the invention. In the drawings:

FIG. 1 is a rear perspective view of an apparatus constructed according to the present invention; and, FIG. 2 is a fragmentary sectional view, taken generally along section lines 2—2 of FIG. 1, showing the apparatus of FIG. 1 mounted on a boat transom, and supporting an engine.

Referring now to the drawings and particularly to FIG. 2, an engine mount 16 for mounting an engine 18 from the transom 20 of a light marine craft 24 includes first means 26 for hooking over the transom 20. The first means includes a first plate 30 which mounts generally parallel to the inboard side 32 of transom 20. As illustrated, it is frequently convenient to provide a spacer block 34 on the inboard side 32 of the transom 20, although it will readily be appreciated that, with particular designs of the mount 16 or transom 20 configurations, no spacer block 34 will be necessary. Alternatively, the spacer block can be provided on the outboard side 36 of the transom 20 in a particular application, within the scope of the invention.

The first means 26 further includes a pair of vertically extending brackets 38 adjacent the ends of the first plate 30. Brackets 38 are welded, or otherwise fixed to the plate 30. The brackets 38 are somewhat hook-shaped. The upper ends 40 of brackets 38 are sandwiched between pairs of connecting links 42. The connecting links 42 are pivotally attached by bolts or pins 44 to the upper ends 40. This pivotal attachment is selectively adjustable, by loosening the bolts 44. The relative orientations between the pairs of connecting links 42 and the upper ends 40 may be fixed by tightening the bolts 44.

The inner connecting link 42 of each pair is provided with a jacking block 46 providing a threaded passageway. Jacking bolts 48 are threaded into the passageways and rest against the vertically upper edge 50 of the transom 20. The rearward ends of the connecting links 42 are provided with slots 52 which extend generally longitudinally of the links 42, i.e., in the fore-to-aft direction of craft 24.

The mount 16 further includes second, or engine support, means 54 including a second plate 56 for mounting generally parallel to the transom on the outboard side 36 thereof. The illustrative second plate 56 is mounted flush with the outboard side 36 of the transom, but as discussed above, it may be desirable in certain instances to provide a spacer block, such as spacer block 34, between the outboard side 36 of the transom 20 and the plate 56. Each of plates 30, 56 includes a plurality of slots 58 which extend generally vertically of the transom 20. Here it must be appreciated that the term "generally vertically" emcompasses very many instances in which the transom 20 does not actually extend vertically, i.e., at 90° to the horizontal. Transoms on very many high performance marine craft make obtuse angles with the bottoms of the hulls of such craft. Occasionally, the transoms of light marine craft even make acute angles with the bottoms of the hulls of such craft. Accordingly, the term "generally vertically" is intended to describe these situations.

Bolts 60 extend through passages provided in the transom 20 and spacer block 34, and through the mating slots 58 on plates 30, 56 to attach plates 30, 56 to the inboard and outboard sides of transom 20, respectively. Nuts are tightened onto the bolts 60 to position the plates 30, 56 securely relative to the transom 20. It will immediately be appreciated that plates 30, 56 can be raised or lowered relative to the transom 20, even with the engine 18 mounted on the mount 16, by the use of the jacking bolts 48, which bear against the vertically upper edge 50 of transom 20. The nuts are loosened on bolts 60, the bolts 48 are turned to move the engine mount 16 either upward or downward with respect to the vertically upper edge 50 of the transom 20, and then the nuts are tightened on bolts 60 to position the plates 30, 56 securely relative to the transom 20.

An auxiliary inboard mounting plate 61 can be used as shown to bolt the lower end of plate 56 to transom 20. Alternatively, plate 36 can be made of sufficient length that the auxiliary plate 61 is unnecessary. The engine mount design chosen for a particular marine craft style depends upon the design of that craft's transom.

The engine support means 54 further includes an engine carrier plate 62 mounted from the second plate 56 by a pair of rearwardly extending sideplate brackets 64. Brackets 64 are fixed near the opposite vertically extending edges 66 of plate 56, and extend generally transversely across the horizontal dimension of the transom 20. Near its upper end 68, each of the sideplate brackets 64 extends between a respective pair of the connecting links 42 in sandwiched relation. The upper end 68 of each sideplate bracket 64 is provided with an aperture which is aligned with the slots 52 in the rearward ends of the connecting links 42. A bolt 70 is passed through each aperture and pair of aligned slots 52. Nuts are fixed on the ends of the bolts 70. The nuts are loosened to permit pivotal and longitudinal sliding movement of the second means 54 relative to the connecting links 42. Tightening of the nuts on the bolts 70 selectively fixes the positions of the second means 54 relative to the first means 26.

If the engine mount 16 is to remain on one marine craft, it may be desirable to fix the relative orientations of the first and second means permanently. This may be done by placing small bolts, metal screws or the like at points 71.

It will be appreciated by referring to FIG. 2 that each of the sideplate brackets 64 is wider adjacent its top end than it is adjacent its bottom end. This means that the engine carrier plate 62, which is attached to the aft edges of the sideplate brackets 64, slopes downwardly and rearwardly away from the outboard side 36 of transom 20. The engine carrier plate 62 is provided with suitable passageways 72 which align with passageways 74 in an engine mounting plate 76. Bolts 78 extend through the passageways 72, 74 to attach the mounting plate 76 to the carrier plate 62. The mounting plate 76 is provided with a trunnion 80. Trunnions 82 fixed to the drive shaft housing 84 of engine 18 beneath the cowling 86 for the engine are attached to the trunnion 80 by a trunnion pin 90 which positions the engine 18 for tilting movement in a generally vertical plane behind the transom 20.

The engine mounting plate 76 includes pivot mountings 94 for the rods 96 of engine tilting pistons (not shown) which reciprocate in engine tilting cylinders 98 integrally formed on the engine drive shaft housing 84. Hydraulic pressure provided by means of hydraulic lines (not shown) to one side or the other of each of the engine tilting pistons in the cylinders 98 permits tilting of the engine in the vertical plane such that the axis of rotation 100, the centerline of thrust, of propeller 102 points upward and away from the transom 20. This is necessary, for example, to permit clearing of weeds, grasses, which might foul the propeller 102 when the marine craft is run across a weed bed or the like.

Pressure in the hydraulic cylinder 98 on the other sides of the engine tilting piston permits the centerline of thrust 100 to be dropped back horizontal to permit driving of the marine craft. The configurations of the sideplate brackets 64 further permits tilting of the centerline of thrust 100 downward and away from the transom 20, as the drive shaft housing 84 is brought to the position illustrated in broken lines in FIG. 2, to "tuck" the propeller 102 in behind and beneath the transom 20. As discussed previoulsy, this feature of the engine mount 16 permitting tucking in of the propeller 102 behind and beneath the transom 20 permits the marine craft operator to provide a power-on thrust which gives forward motion with a greater lift factor than with prior art engine mounts. With forward motion and the lift factor working simultaneously, the marine craft will not bog down, as can occur with prior art engine mounts.

What is claimed is:

1. An engine mount for a marine craft outboard engine comprising first means for hooking over the transom of the marine craft, the first means including a first plate for mounting on the inboard side of the transom and for permitting vertical adjustment of the first means relative to the transom, engine support means, and means for movably mounting the engine support means on the first means, the engine support means including a second plate for mounting on the outboard side of the transom, the movable mounting means permitting engagement of the first and second plates with transoms having varying configurations, the engine support means further including a third plate for mounting the engine, the third plate being mounted stationarily relative to the second and extending at an angle to the second plate from a greater separation toward the top of the transom to a lesser separation toward the bottom of the transom.

2. The apparatus of claim 1 wherein the first and second plates and movable mounting means cooperate to clamp the transom between the first and second plates.

3. The apparatus of claim 1 wherein the first means further includes selectively adjustable means for jacking the first means and engine support means relative to the vertically upper edge of the transom selectively to position the engine vertically relative to the transom.

4. An engine mount for a marine craft outboard engine comprising first means for mounting over the vertically upper edge of the marine craft transom, second means for attachment to the first means, means for selectively movably mounting the second means relative to the first, and third means for mounting the engine, the third means including a pair of spaced supports extending generally rearwardly from the transom to define support edges remote from the transom, and a mounting extending between the support edges, the mounting including means for mounting the engine for tilting movement in a generally vertical plane behind the transom.

5. The apparatus of claim 4 wherein the first means comprises a first plate for mounting on the inboard side of the transom to extend generally parallel to the inboard side, the second means comprises a second plate for mounting on the outboard side of the transom, each of the plates including a generally vertically extending slot, a bolt extending through each said slot and the transom, and a nut threaded on the bolt to capture the first and second plates on the inboard and outboard sides of the transom, respectively, loosening of the nut permitting both plates to slide vertically on the transom selectively to raise and lower the engine relative to the transom.

6. The apparatus of claim 5 wherein the first means further includes means for jacking the first and second plates vertically relative to the upper edge of the transom.

7. The apparatus of claim 4 wherein the means for selectively movably mounting the second means relative to the first includes means for pivotally mounting the second means relative to the first.

8. The apparatus of claim 4 wherein the means for selectively movably mounting the second means relative to the first includes means providing a slot on one of the first and second means and means providing a pin on the other of the first and second means, the pin extending through the slot, and selectively movable in the slot, and including means for securing said one of said first and second means adjacent the slot to maintain the selected relative position of the pin in the slot to maintain the orientation of the second means relative to the first.

9. An engine mount for a marine craft outboard engine comprising first means for mounting over the vertically upper edge of the marine craft transom, second means for attachment to the first means, means for selectively movably attaching the second means from the first, and means for mounting the engine rearwardly of the second means, the engine mounting means including an engine carrier which permits tilting movement of the engine to position the axis of rotation of the engine propeller such that it points downwardly away from the transom and upwardly toward the transom.

10. The apparatus of claim 9 wherein the engine mounting means includes means for supporting the engine carrier rearwardly from the second means.

11. The apparatus of claim 10 wherein the means for supporting the engine carrier rearwardly from the second means includes a bracket mounted on, and extending rearwardly from the second means, the bracket including a rearward portion upon which the carrier is located.

12. The apparatus of claim 11 including a pair of such brackets, the brackets extending generally transversely of the horizontal extent of the second means and transom along the second means and spaced apart generally longitudinally of the horizontal extend of the transom.

* * * * *

UNITED STATES PATENT AND TRADEMARK OFFICE

CERTIFICATE OF CORRECTION

PATENT NO. : 4,239,172

DATED : December 16, 1980

INVENTOR(S) : Gordon Spitzmesser

It is certified that error appears in the above-identified patent and that said Letters Patent are hereby corrected as shown below:

Column 6, line 33, (Claim 12, last line) change "extend" to -- extent --.

Signed and Sealed this

*Twenty-eighth* Day of *April 1981*

[SEAL]

*Attest:*

RENE D. TEGTMEYER

*Attesting Officer* *Acting Commissioner of Patents and Trademarks*